(12) United States Patent
Chen

(10) Patent No.: US 10,286,644 B2
(45) Date of Patent: May 14, 2019

(54) THREE-DIMENSIONAL PRINTER WITH CLEANING FUNCTION

(71) Applicants: XYZPRINTING, INC., New Taipei (TW); KINPO ELECTRONICS, INC., New Taipei (TW)

(72) Inventor: Chung-Ju Chen, New Taipei (TW)

(73) Assignees: XYZPRINTING, INC., New Taipei (TW); KINPO ELECTRONICS, INC., New Taipei (TW)

(*) Notice: Subject to any disclaimer, the term of this patent is extended or adjusted under 35 U.S.C. 154(b) by 249 days.

(21) Appl. No.: 15/388,071

(22) Filed: Dec. 22, 2016

(65) Prior Publication Data
US 2018/0126672 A1 May 10, 2018

(30) Foreign Application Priority Data

Nov. 10, 2016 (CN) .......................... 2016 1 0989323

(51) Int. Cl.
| | |
|---|---|
| *B29C 64/30* | (2017.01) |
| *B29C 64/35* | (2017.01) |
| *B33Y 30/00* | (2015.01) |
| *B33Y 40/00* | (2015.01) |
| *B29C 64/141* | (2017.01) |
| *B29C 64/364* | (2017.01) |

(52) U.S. Cl.
CPC ............ *B33Y 40/00* (2014.12); *B29C 64/141* (2017.08); *B29C 64/35* (2017.08); *B33Y 30/00* (2014.12); *B29C 64/30* (2017.08); *B29C 64/364* (2017.08)

(58) Field of Classification Search
CPC ....... B29C 35/02; B29C 64/35; B29C 64/364; B29C 64/10; B33Y 30/00; B33Y 40/00
See application file for complete search history.

(56) References Cited

U.S. PATENT DOCUMENTS

| | | | | |
|---|---|---|---|---|
| 7,731,328 | B2* | 6/2010 | Jung | B41J 2/16585 347/32 |
| 10,099,478 | B2* | 10/2018 | Ohnishi | B41J 2/16505 |
| 2003/0202034 | A1* | 10/2003 | Lodal | B41J 2/16508 347/33 |
| 2010/0247703 | A1* | 9/2010 | Shi | B29C 64/165 425/375 |
| 2015/0231832 | A1* | 8/2015 | Shi | B29C 67/0096 425/226 |

\* cited by examiner

*Primary Examiner* — Nahida Sultana
*Assistant Examiner* — Debjani Roy
(74) *Attorney, Agent, or Firm* — Chun-Ming Shih; HDLS IPR Services

(57) ABSTRACT

A three-dimensional printer with a cleaning function includes a machine table, a printing unit, a cleaning mechanism, and a control unit. The machine table has a work area and also includes a formation portion and an arrangement portion on the work area. The printing unit is disposed on the machine table and movable with respect to the machine table to form a reciprocating path. The arrangement portion is on the reciprocating path. The cleaning mechanism is disposed on the arrangement portion and includes a scraper having a contact portion. The control unit is electrically coupled to the printing unit and the cleaning mechanism, wherein the control unit selectively controls the contact portion of the scraper to protrude out of the machine table, so that a nozzle of the printing unit is cleaned by rubbing against the contact portion when moving in the reciprocating path.

17 Claims, 6 Drawing Sheets

THREE-DIMENSIONAL PRINTER WITH CLEANING FUNCTION

TECHNICAL FIELD

The present invention relates to a three-dimensional printer and, in particular, to a three-dimensional printer with a cleaning function.

BACKGROUND

Due to the development of three-dimensional printing (3D printing), there is a new revolution in the industries since products can directly be printed out using digital files of models.

There are a lot of 3D printing technologies in the market. Taking as an example the 3DP technology carrying out printing in a layer-by-layer manner, a printer typically generates dust when powder is arranged or scraped. Since a nozzle of the printer may have remained adhesive, spilled or escaped powder easily adheres to the nozzle, making the nozzle dirtier than before. The nozzle will be damaged if more and more spilled or escaped powder adheres to the nozzle. Therefore, it is necessary to add a cleaning module for cleaning.

However, although a conventional cleaning module for the 3D printer can clean the dirty nozzle, it has some defects as follows. When cleaning the nozzle, a printing operation of the nozzle has to stop, and the nozzle has to stay in a particular position in order to be cleaned by the cleaning module. This takes up the printing time and wastes time, no matter how fast the cleaning module can clean the nozzle.

Accordingly, the target of the inventor is to improve the above-mentioned defects, on the basis of which the present invention is accomplished.

SUMMARY

It is an object of the present invention to provide a three-dimensional printer with a cleaning function, which can print without the need to stop printing or to interrupt a printing operation, and thereby printing can be carried out continuously when the nozzle is cleaned, and no printing time will be taken up for cleaning. Moreover, the present invention prevents the printing unit from being rubbed and cleaned every time it passes the cleaning mechanism, thereby ensuring a lifespan of the nozzle.

Accordingly, the present invention provides a three-dimensional printer with a cleaning function, for printing a three-dimensional object in an layer-by-layer manner, comprising: a machine table, the machine table including a work area and also including a formation portion and an arrangement portion on the work area; a printing unit, the printing unit being disposed on the machine table and movable with respect to the machine table to form a reciprocating path, the arrangement portion being disposed on the reciprocating path, the printing unit including at least one nozzle; a cleaning mechanism, the cleaning mechanism being disposed on the arrangement portion and including a scraper, the scraper including a contact portion; and a control unit electrically coupled to the printing unit and the cleaning mechanism, wherein the control unit selectively controls the contact portion of the scraper to protrude out of the machine table, so that the at least one nozzle of the printing unit is cleaned by rubbing against the contact portion when moving in the reciprocating path.

Compared with the conventional techniques, the present invention has the following functions. The nozzle of the printing unit can be cleaned without the need to stop printing or the need to interrupt the printing operation, so printing can be carried out continuously, and no printing time will be taken up for cleaning.

BRIEF DESCRIPTION OF THE DRAWINGS

The disclosure will become more fully understood from the detailed description, and the drawings given herein below is for illustration only, and thus does not limit the disclosure, wherein.

DETAILED DESCRIPTION

Detailed descriptions and technical contents of the present invention are illustrated below in conjunction with the accompany drawings. However, it is to be understood that the descriptions and the accompany drawings disclosed herein are merely illustrative and exemplary and not intended to limit the scope of the present invention.

The present invention provides a three-dimensional printer with a cleaning function, whereby a nozzle of various three-dimensional printers can be cleaned, such as those three-dimensional printers which use three-dimensional-printing (3DP) techniques or a process of depositing successive layers of powder onto a substrate to form a three-dimensional object.

Figure 1:
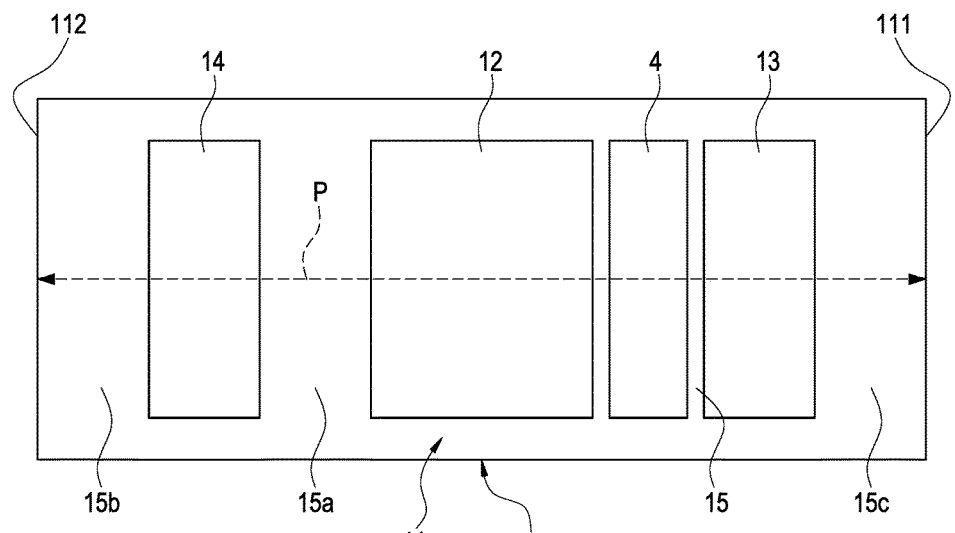
FIG. 1 is a top view showing a three-dimensional printer of the present invention with omission of a printing unit.
Figure 2:
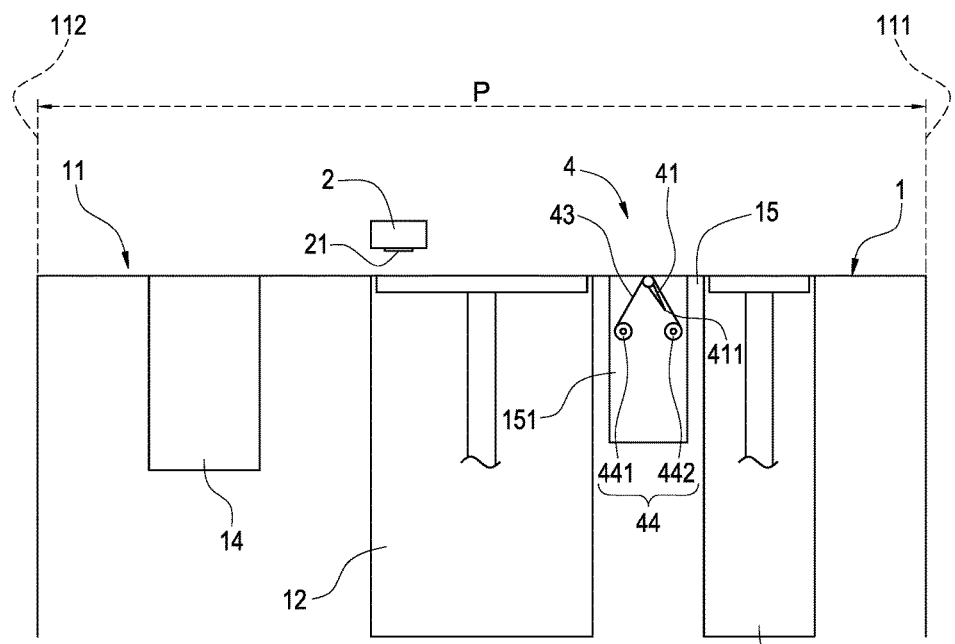
FIG. 2 is a side view showing the three-dimensional printer of the present invention.
Figure 3:
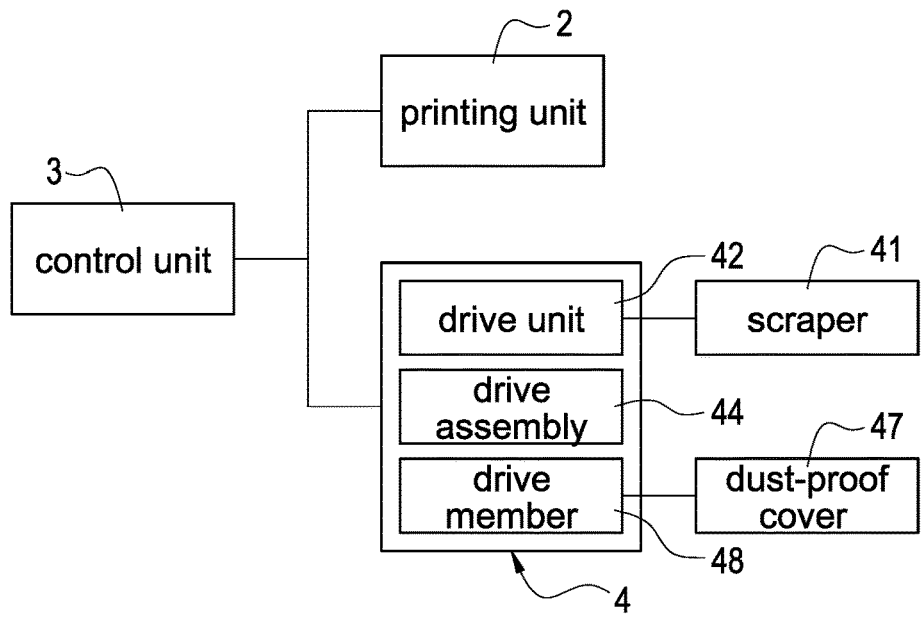
FIG. 3 is a diagram illustrating a control circuit of the three-dimensional printer.

Please refer to FIGS. 1, 2 and 3, showing a three-dimensional printer of the present invention for printing a three-dimensional object (not illustrated) in a layer-by-layer manner. The three-dimensional printer includes a machine table 1, a printing unit 2, a control unit 3, and a cleaning mechanism 4.

The machine table 1 has a work area 11 and also has a formation portion 12 and an arrangement portion 15 on the work area 11. In other words, the arrangement portion 15 (not illustrated) is the work area 11 with the exception of the formation area 12. In terms of a three-dimensional printer using the 3DP techniques, the machine table 1 further has a power supply portion 13 and a recycling portion 14. The formation portion 12, the arrangement portion 15, the powder supply portion 13, and the recycling portion 14 are arranged at different locations in the work area 11. The formation portion 12 is arranged between the powder supply portion 13 and the recycling portion 14 in spaced apart relationship to each other. Therefore, the work area 11, with the exception of the formation portion 12, the powder supply portion 13 and the recycling portion 14, is the arrangement portions 15, 15a, 15b, 15c.

The printing unit 2 is disposed on the machine table 1 and includes at least one nozzle 21. The printing unit 2 is disposed on the machine table 1 and movable with respect to the machine table 1 to form a reciprocating path P. The work area 11 includes a first edge 111 and a second edge 112 opposite to each other. The reciprocating path P is formed between the first edge and the second edge 112. One, more, or all of the arrangement portions are on the reciprocating path P. In the drawings, the arrangement portions 15, 15a, 15b, 15c are all on the reciprocating path P.

The cleaning mechanism 4 is disposed in one of the arrangement portions 15, 15a, 15b, 15c, so that the printing unit 2 can be cleaned while it passes the cleaning mechanism 4 during a printing operation. The present invention does not limit the cleaning mechanism 4 to be disposed in a particular arrangement portion. In the present embodiment, the cleaning mechanism 4 is disposed in the arrangement portion 15 as an example. The arrangement portion 15 is disposed between the formation portion 12 and the powder supply portion 13. Furthermore, the arrangement portion 15 is preferably disposed with a receiving container 151, and the cleaning mechanism 4 is disposed in the receiving container 151.

According to the first embodiment of the present invention, the cleaning mechanism 4 includes a scraper 41, and preferably also includes a drive unit 42, a cleaning element 43 and a drive assembly 44. The scraper 41 includes a contact portion 411, and the contact portion 411 is used to directly or indirectly contact the nozzle 21.

The control unit 3 is disposed in any place of the machine table 1 and is electrically coupled to the printing unit 2 and the cleaning mechanism 4 (see FIG. 3), so that the control unit 3 can control operations of the printing unit 2 and the cleaning mechanism 4 individually.

A first modification of the present embodiment is: when the cleaning mechanism 4 only includes the scraper 41 (not illustrated), the control unit 3 selectively controls the contact portion 411 of the scraper 41 to protrude out of the machine table, so that the nozzle 21 of the printing unit 2 is cleaned by rubbing against the contact portion 411 when moving in the reciprocating path P. Furthermore, the scraper 41 can be a resilient cam (not illustrated), as a foam rubber, a sponge or any other suitable resilient object, in order to directly rub against the nozzle 21 to clean it.

Figure 4:
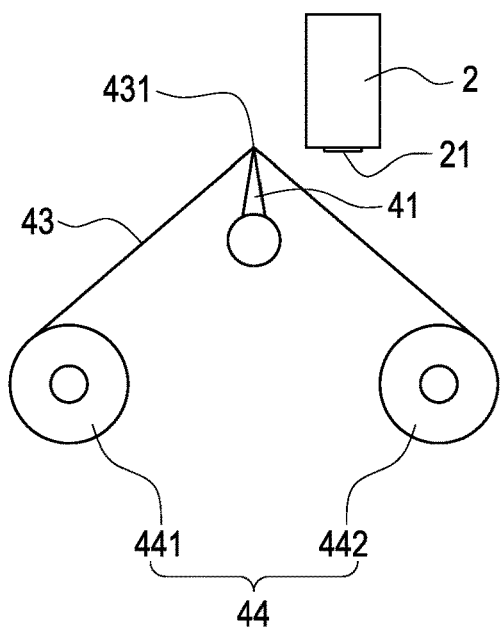
FIG. 4 is a side view showing a cleaning mechanism of the three-dimensional printer in a lifted state before cleaning.

A second modification of the present embodiment is: when the cleaning mechanism 4 further includes the cleaning element 43 (not illustrated), the cleaning element 43 is disposed corresponding to the scraper 41. The control unit 3 selectively controls the scraper 41 to lift the cleaning element 43 (see FIG. 4), so that the contact portion 411 of the scraper 41 is in contact with the cleaning element 43 to form a contact surface 431 on the cleaning element 43. At this point, being lifted, the contact surface 431 protrudes out of the machine table 1, so that the nozzle 21 of the printing unit 2 is cleaned by rubbing against the contact surface 431.

Figure 5:
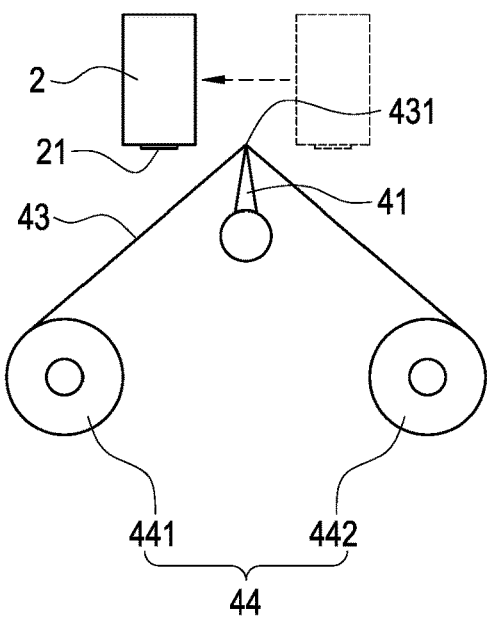
FIG. 5 is a side view showing the cleaning mechanism of FIG. 4 in the lifted state after cleaning.
Figure 6:
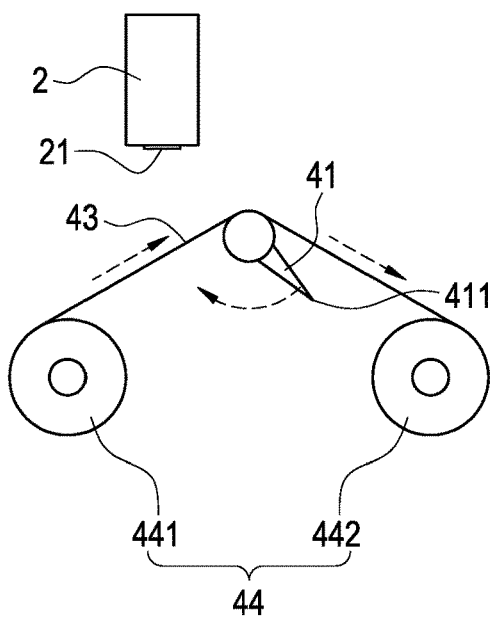
FIG. 6 is a side view showing that the cleaning mechanism of FIG. 4 descends back.

A third modification of the present embodiment is: when the cleaning mechanism 4 further includes a drive assembly 44 (see FIGS. 4 to 6), the cleaning element 43 winds around the scraper 41 and the drive assembly 44, and the control unit 3 controls the drive assembly 44 to drive the cleaning element 43 to move relative to the scraper 41, so that clean portions of the cleaning element 43 can in turn rub against the nozzle 21 to clean it. It is preferable that the drive assembly 44 includes a reel-out roller 441 and a reel-in roller 442, two ends of the cleaning element 43 wind around the reel-out roller 441 and the reel-in roller 442 respectively, and a portion of the cleaning element 43 between the reel-out roller 441 and the reel-in roller 442 is wound around the scraper 41, so that the cleaning element 43 originally wound around the reel-out roller 441 can be reeled out in sequence, and then the reeled-out cleaning element 43 can be reeled in to wind around the reel-in roller 442, and thereby the clean portions of the cleaning element 43 can in turn be used for cleaning.

As to "selectively controlling" mentioned above, it means that after the printing unit 2 performs printing for a predetermined period of time, the control unit 3 controls the contact portion 411 of the scraper 41 to protrude out of the machine table 1, or it means that after the printing unit 2 prints a predetermined number of layers, the contact portion 411 of the scraper 41 is controlled to protrude out of the machine table 1. Both are examples only, and in fact there are more methods besides these two methods. Accordingly, the control unit 3 can control motions of the scraper 41 by one of many possible methods.

As shown in FIG. 3, the control unit 3 preferably controls the motions of the scraper 41 via the drive unit 42. In detail, the control unit 3 controls operations of the drive unit 42, and the drive unit 42 drives the scraper 41 to move linearly a distance (not illustrated) or to rotate by an angle (see FIGS. 4 to 6), so that the contact portion 411 of the scraper 41 can protrude out of the machine table 1 to rub against the nozzle 21.

Figure 7:
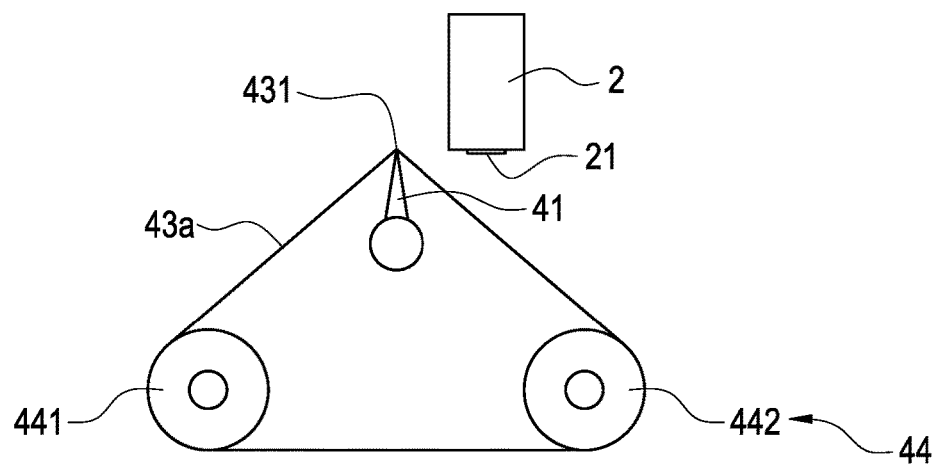
FIG. 7 is a side view showing the cleaning mechanism in the lifted state before cleaning, according to the second embodiment.

Referring to FIG. 7 illustrating the second embodiment of the cleaning mechanism 4, the present embodiment is similar to the first embodiment, the only difference resides in that, instead of the non-surrounding type of the first embodiment, the cleaning element 43a of the present embodiment is a surrounding type, i.e. the cleaning element 43a is wound between the scraper 41, the reel-out roller 441 and the reel-in roller 442, and thereby the cleaning element 43a can be used in circulated manner.

Figure 8:
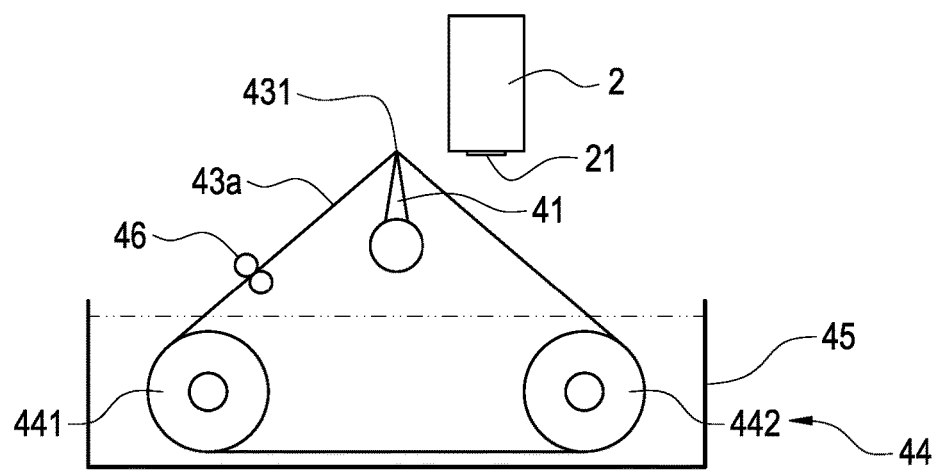
FIG. 8 is a side view showing the cleaning mechanism in the lifted state before cleaning, according to the third embodiment.

Referring to FIG. 8 illustrating the third embodiment of the cleaning mechanism 4, the third embodiment is similar to the second embodiment, and the only difference resides in that the cleaning mechanism 4 of the third embodiment further includes a water container 45, and the cleaning mechanism 4 preferably also includes a clamping member 46, as more fully detailed below.

The cleaning element 43a becomes dirty from cleaning the nozzle 21. In order to clean the cleaning element 43a, a portion of the cleaning element 43a is immersed in the water container 45. A liquid in the water container 45 can be normal water or can be any suitable liquid having a cleaning effect; the present invention is not limited in this regard. As to the portion of the cleaning element 43a immersed in the water container 45, it can be any portions of the cleaning element 43a excluding the portions wound on the scraper 41. In the present embodiment, the portions of the cleaning element 43a wound between the reel-out roller 441 and the reel-in roller 442 are described as an example.

Furthermore, in order to make the cleaned cleaning element 43a rub against the nozzle 21 without water, the portion of the cleaning element 43a exposed from the water container 45 is clamped by the clamping member 46. As a result, after the cleaned cleaning element 43a is driven to leave the water container 45 by the drive assembly 44, water of the cleaning element 43a can be removed by a clamping action of the clamping member 46. Certainly, a portion of the cleaning element 43a at which the clamping member 46 clamps is preferably the portion between the reel-out roller 441 and the scraper 41.

Figure 9:
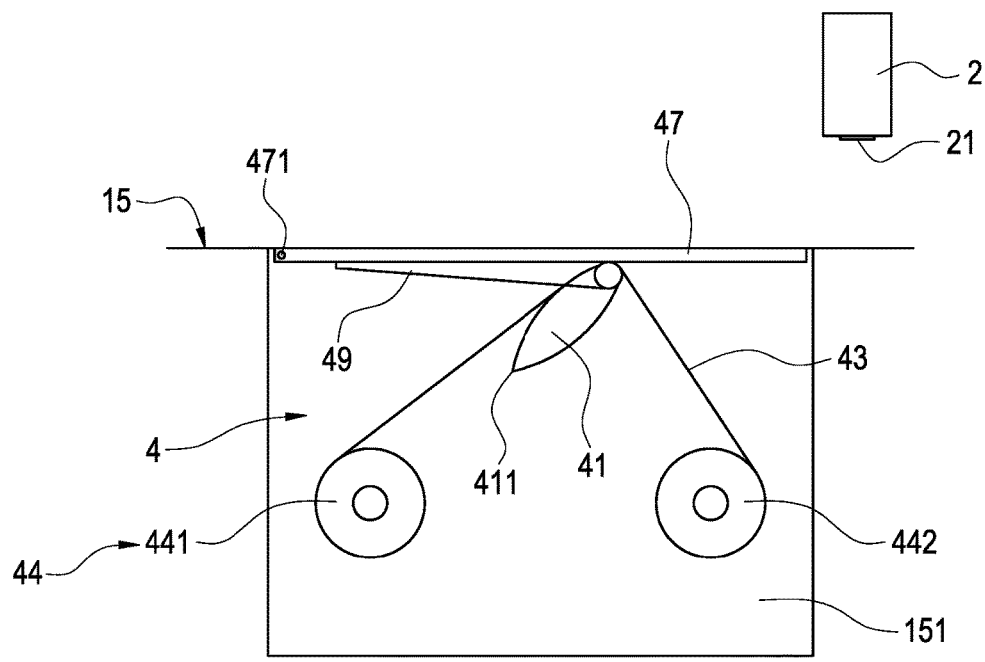
FIG. 9 is a side view showing the cleaning mechanism before lifted, according to the fourth embodiment.
Figure 10:
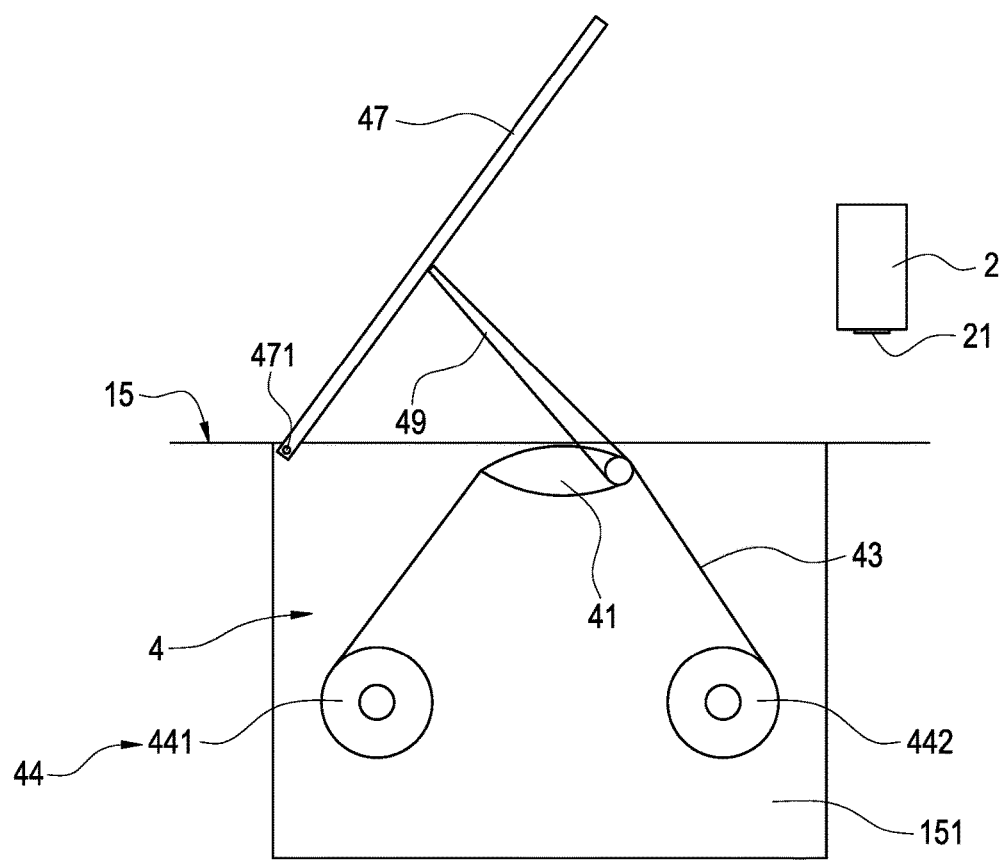
FIG. 10 is a side view showing that the cleaning mechanism of FIG. 9 is lifted to drive the dust-proof cover to open.

Referring to FIGS. 9 and 10 illustrating the fourth embodiment of the cleaning mechanism 4, the fourth embodiment is similar to any of the above-mentioned embodiments (the drawings illustrate an example modified from the first embodiment). The only difference resides in that the cleaning mechanism 4 further includes a dust-proof cover 47 and preferably also includes a drive member 48 and a connection element 49, as more fully detailed hereinafter.

The cleaning mechanism 4 is disposed in the receiving container 151 (see FIGS. 2 and 9). The dust-proof cover 47 covers and closes the receiving container 151 in an openable manner. To be specific, the dust-proof cover 47 has one side pivotally connected, by means of a pivot 471, to a corresponding portion of the receiving container 151 to be opened or closed.

The connection element 49 is disposed between the dust-proof cover 47 and the scraper 41, and the scraper 41 drives the dust-proof cover 47 to open or close by means of the connection element 49. The connection element 49 and the scraper 41 are connected in a coaxial manner, the connection element 49 and the scraper 41 form an included angle, so as to generate a time difference. Accordingly, when the control unit 3 controls the scraper 41 to drive the connection element 49 to rotate coaxially with the scraper 41, the connection element 49 drives the dust-proof cover 47 to open, and then the scraper 41 lifts the cleaning element 43. On the other hand, by means of coaxial reverse rotation, the dust-proof cover 47 is closed and the scraper 41 descends back.

As shown in FIG. 3, certainly, besides using the connection element 49 to drive the dust-proof cover 47 to open or close, the present embodiment can alternatively use the drive member 48 to drive the dust-proof cover 47 to open or close. In other words, the control unit 3 controls operations of the drive member 48, and the drive member 48 drives the dust-proof cover 47 to open or close. The dust-proof cover 47 can be opened and closed by any feasible methods other than the two methods described above using the connection element 49 or the drive member 48; the present invention is not limited in this regard.

By adding the dust-proof cover 47, the present invention prevents impurities from being attached to the scraper 41 and the cleaning element 43, 43a or polluting the liquid in the water container 45. For example, the three-dimensional printer using the 3DP techniques typically generates dust. By utilizing the dust-proof cover 47, the present invention prevents dust from being attached to the scraper 41 and the cleaning element 43, 43a or polluting the liquid in the water container 45.

The cleaning mechanism 4 of the present invention can be disposed on the arrangement portion 15 between the formation portion 12 and the powder supply portion 13. Alternatively, the cleaning mechanism 4 of the present invention can be disposed on the arrangement portion 15a between the formation portion 12 and the recycling portion 14, on the arrangement portion 15b between the second edge 112 and the recycling portion 14, or on the arrangement portion 15c between the powder supply portion 13 and the first edge 111.

Furthermore, the present invention can include multiple cleaning mechanisms 4, so the multiple cleaning mechanisms 4 can be disposed on any selected ones of the arrangement portions 15, 15a, 15b, 15c at the same time.

In summary, compared with conventional techniques, the present invention has the following functions. By disposing the cleaning mechanism 4 on the reciprocating path P of the printing unit 2 and by utilizing the control unit 3 to selectively control the contact portion 411 of the scraper 41 or the contact surface 431 of the cleaning element 43, 43a, the nozzle 21 of the printing unit 2 can be cleaned by rubbing against the contact portion 411 or the contact surface 431 while the nozzle 21 is moving during the printing operation. As a result, the nozzle 21 can be cleaned without the need to stop printing and without taking up the printing time. Moreover, the scraper 41 does not keep the contact portion 411 of the scraper 41 or the contact surface 431 protrude out of the machine table 1 all the time, thereby avoiding the nozzle 21 to be worn by too many rubbing actions. In other words, the present invention prevents the printing unit 2 from being rubbed and cleaned every time it passes the cleaning mechanism 4, so as to ensure a long lifespan of the nozzle 21.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A three-dimensional printer with a cleaning function, for printing a three-dimensional object in a layer-by-layer manner, comprising:
    a machine table, the machine table including a work area, and the work area including a formation portion and an arrangement portion;
    a printing unit, the printing unit being disposed on the machine table and movable with respect to the machine table to form a reciprocating path, the arrangement portion being disposed on the reciprocating path, the printing unit including at least one nozzle;
    a cleaning mechanism, the cleaning mechanism being disposed on the arrangement portion and including a scraper, the scraper including a contact portion; and
    a control unit electrically coupled to the printing unit and the cleaning mechanism, wherein the control unit selectively controls the contact portion of the scraper to protrude out of the machine table, so that the at least one nozzle of the printing unit is cleaned by rubbing against the contact portion when moving in the reciprocating path;
    wherein the cleaning mechanism further includes a dust-proof cover, a receiving container is disposed in the arrangement portion, the cleaning mechanism is disposed in the receiving container, and the dust-proof cover covers and closes the receiving container in an openable manner; and
    wherein the cleaning mechanism further includes a connection element, the connection element is disposed between the dust-proof cover and the scraper, and the scraper drives the dust-proof cover to open or close by the connection element.

2. The three-dimensional printer with the cleaning function of claim 1, wherein the control unit selectively controls the contact portion of the scraper to protrude out of the machine table during a printing operation of the printing unit.

3. The three-dimensional printer with the cleaning function of claim 1, wherein the cleaning mechanism further includes a cleaning strip, the cleaning strip is disposed corresponding to the scraper, the control unit selectively controls the scraper to lift the cleaning strip, so that the contact portion of the scraper is in contact with the cleaning strip to form a contact surface on the cleaning strip, and the at least one nozzle of the printing unit is cleaned by rubbing against the contact surface.

4. The three-dimensional printer with the cleaning function of claim 2, wherein the cleaning mechanism further includes a cleaning strip, the cleaning strip is disposed corresponding to the scraper, the control unit selectively controls the scraper to lift the cleaning strip, so that the contact portion of the scraper is in contact with the cleaning strip to form a contact surface on the cleaning strip, and the at least one nozzle of the printing unit is cleaned by rubbing against the contact surface.

5. The three-dimensional printer with the cleaning function of claim 3, wherein the cleaning mechanism further includes a drive unit, the control unit controls operations of the drive unit, and the drive unit drives the scraper to rotate by an angle or to linearly move a distance to lift the cleaning strip.

6. The three-dimensional printer with the cleaning function of claim 3, wherein the cleaning mechanism further includes a drive assembly, the cleaning strip winds around the scraper and the drive assembly, and the control unit controls the drive assembly to drive the cleaning strip to move relative to the scraper.

7. The three-dimensional printer with the cleaning function of claim 6, wherein the drive assembly includes a reel-out roller and a reel-in roller, two ends of the cleaning strip wind around the reel-out roller and the reel-in roller respectively, and a portion of the cleaning strip between the reel-out roller and the reel-in roller is wound around the scraper.

8. The three-dimensional printer with the cleaning function of claim 6, wherein the drive assembly includes a reel-out roller and a reel-in roller, and the cleaning strip is wound and circulated around the scraper, the reel-out roller, and the reel-in roller.

9. The three-dimensional printer with the cleaning function of claim 8, wherein the cleaning mechanism further includes a water container, and a portion of the cleaning strip between the reel-out roller and the reel-in roller is immersed in the water container.

10. The three-dimensional printer with the cleaning function of claim 9, wherein the cleaning mechanism further includes a clamping member, and the clamping member clamps a portion of the cleaning strip exposed out of the water container.

11. The three-dimensional printer with the cleaning function of claim 1, wherein the control unit can control operations of the printing unit and the cleaning mechanism individually, and the control unit can control motions of the scraper to drive the dust-proof cover to open or close.

12. The three-dimensional printer with the cleaning function of claim 1, wherein the cleaning mechanism further includes a drive member, the control unit controls operations of the drive member, and the drive member drives the dust-proof cover to close or open.

13. The three-dimensional printer with the cleaning function of claim 1, wherein the connection element and the scraper are connected in a coaxial manner, the connection element and the scraper form an included angle, and the control unit controls the scraper to drive the connection element to rotate coaxially with the scraper.

14. The three-dimensional printer with the cleaning function of claim 1, wherein the machine table further includes a powder supply portion in the work area, and the arrangement portion is disposed between the formation portion and the powder supply portion.

15. The three-dimensional printer with the cleaning function of claim 1, wherein the machine table further includes a powder supply portion in the work area, the work area includes a first edge and a second edge opposite to the first edge, and the arrangement portion is disposed between the first edge and the powder supply portion.

16. The three-dimensional printer with the cleaning function of claim 1, wherein the machine table further includes a recycling portion in the work area, and the arrangement portion is disposed between the formation portion and the recycling portion.

17. The three-dimensional printer with the cleaning function of claim 1, wherein the machine table further includes a recycling portion in the work area, the work area includes a first edge and a second edge opposite to the first edge, and the arrangement portion is disposed between the second edge and the recycling portion.

* * * * *